US00RE34479E

United States Patent [19]

Minoura

[11] E Patent Number: Re. 34,479

[45] Reissued Date of Patent: Dec. 14, 1993

[54] RESISTENCE APPLYING MEANS FOR EXERCISING APPARATUS

[75] Inventor: Chihiro Minoura, Gifu, Japan

[73] Assignee: Minoura Carrier & Stand Works Co., Ltd.

[21] Appl. No.: 509,539

[22] Filed: Mar. 30, 1990

Related U.S. Patent Documents

Reissue of:

[64] Patent No.: 4,826,150
Issued: May 2, 1989
Appl. No.: 173,017
Filed: Mar. 22, 1988

U.S. Applications:

[63] Continuation of Ser. No. 882,666, Jul. 7, 1986, abandoned.

[30] Foreign Application Priority Data

Feb. 20, 1986 [JP] Japan ..... 61-36744

[51] Int. Cl.[5] ..... A63B 69/16; A63B 21/005

[52] U.S. Cl. ..... 482/61; 482/63; 482/903; 482/6

[58] Field of Search ..... 272/73, 129, 72, 69; 310/105, 93; 482/57, 61, 63, 65, 1, 4–7, 903

[56] References Cited

U.S. PATENT DOCUMENTS

| | | | |
|---|---|---|---|
| 3,442,131 | 5/1969 | Leyten | 272/73 |
| 3,831,942 | 8/1974 | Del Mar | 310/105 |
| 4,152,617 | 5/1979 | Janson | 310/105 |
| 4,186,320 | 1/1980 | Hillman | 310/105 |
| 4,441,705 | 4/1984 | Brown | 272/73 |
| 4,520,284 | 5/1985 | Wolcott | 310/105 |
| 4,602,373 | 7/1986 | Dorfman | 272/73 |
| 4,775,145 | 10/1988 | Tsuyama | 272/73 |
| 4,853,574 | 8/1989 | Estaque | 310/165 |

FOREIGN PATENT DOCUMENTS

| | | | |
|---|---|---|---|
| 0176962 | 4/1986 | European Pat. Off. | 272/73 |
| 1279201 | 6/1972 | United Kingdom | 272/73 |

*Primary Examiner*—Stephen R. Crow
*Attorney, Agent, or Firm*—Ostrolenk, Faber, Gerb & Soffen

[57] ABSTRACT

A resistance applying mechanism for use in an exercising apparatus having a support frame on which a bicycle provided with at least a saddle and foot pedals is supported includes a rotary shaft rotatably supported by the support frame and driven by operating the foot pedals; a rotating disk made of metal and fixed to the rotary shaft; and at least a pair of permanent magnets for generating an eddy current placed opposite each other with the rotating disk interposed therebetween.

26 Claims, 4 Drawing Sheets

RESISTENCE APPLYING MEANS FOR EXERCISING APPARATUS

Matter enclosed in heavy brackets [ ] appears in the original patent but forms no part of this reissue specification; matter printed in italics indicates the additions made by reissue.

This application is a continuation of application Ser. No. 882,666, filed Jul. 7, 1986 now abandoned.

BACKGROUND OF THE INVENTION

The present invention relates to an exercising apparatus which enables the user to enjoy exercise similar to the actual riding of a bicycle by sitting on the saddle of a stationary bicycle provided on a support frame and rotating the foot pedals. More particularly, the invention relates to means for applying local resistance to the foot pedals of such an exercising apparatus.

The resistance applying means disclosed in U.S. Pat. No. 4,441,705 comprises a disk-like frictional braking device mounted on a rotary shaft which is driven by the rear wheel of a bicycle; and a cage fan unit provided on the rotary shaft whereby the air resistance is increased and decreased depending upon the rotational speed of the rear wheel. A centrifugal control device is connected to the braking device so that the frictional resistance brought about by the braking device depending upon the speed of the rear wheel can be controlled automatically.

However, in this conventional means, the load resistance is reduced as the friction means, such as a lining or pads in the braking device, wears out. Thus, the friction means must be replaced at an early stage, which involves a troublesome maintenance. This means also experiences the problem that air is disturbed with the rotation of the fan and a loud noise is thus generated during use, as well as dust being flung up. The centrifugal control device employed for controlling the load resistance also has the disadvantage of leading to complication of the entire structure of the resistance applying means.

SUMMARY OF THE INVENTION

It is an object of the invention to provide a resistance applying means for an exercising apparatus which is capable of continually applying a stable load resistance for a long period.

It is another object of the invention to provide a resistance applying means which enables an exercising apparatus to be comfortably used without generating a loud noise and flinging up dust.

It is further object of the invention to provide a resistance applying means for an exercising apparatus which is capable of easily constructing a mechanism for providing load resistance.

In order to attain the above-mentioned objects, a resistance applying means for an exercising apparatus of the invention comprises a support frame on which a bicycle provided with at least a saddle and foot pedals is supported; a rotary shaft which is rotatably supported by the support frame and is driven by operating the foot pedals; a rotating disk which is made of metal and is fixed to the rotary shaft; and at least a pair of permanent magnets for generating eddy current placed such as to face each other with the rotating disk interposed therebetween.

Other and further objects of this invention will become apparent from the illustrative embodiments to be described, and various advantages not referred to herein will occur to one skilled in the art upon employment of the invention in practice.

DETAILED DESCRIPTION OF THE PREFERRED EMBODIMENTS

An embodiment of this invention will now be described in detail with reference to the drawings.

Figure 1:
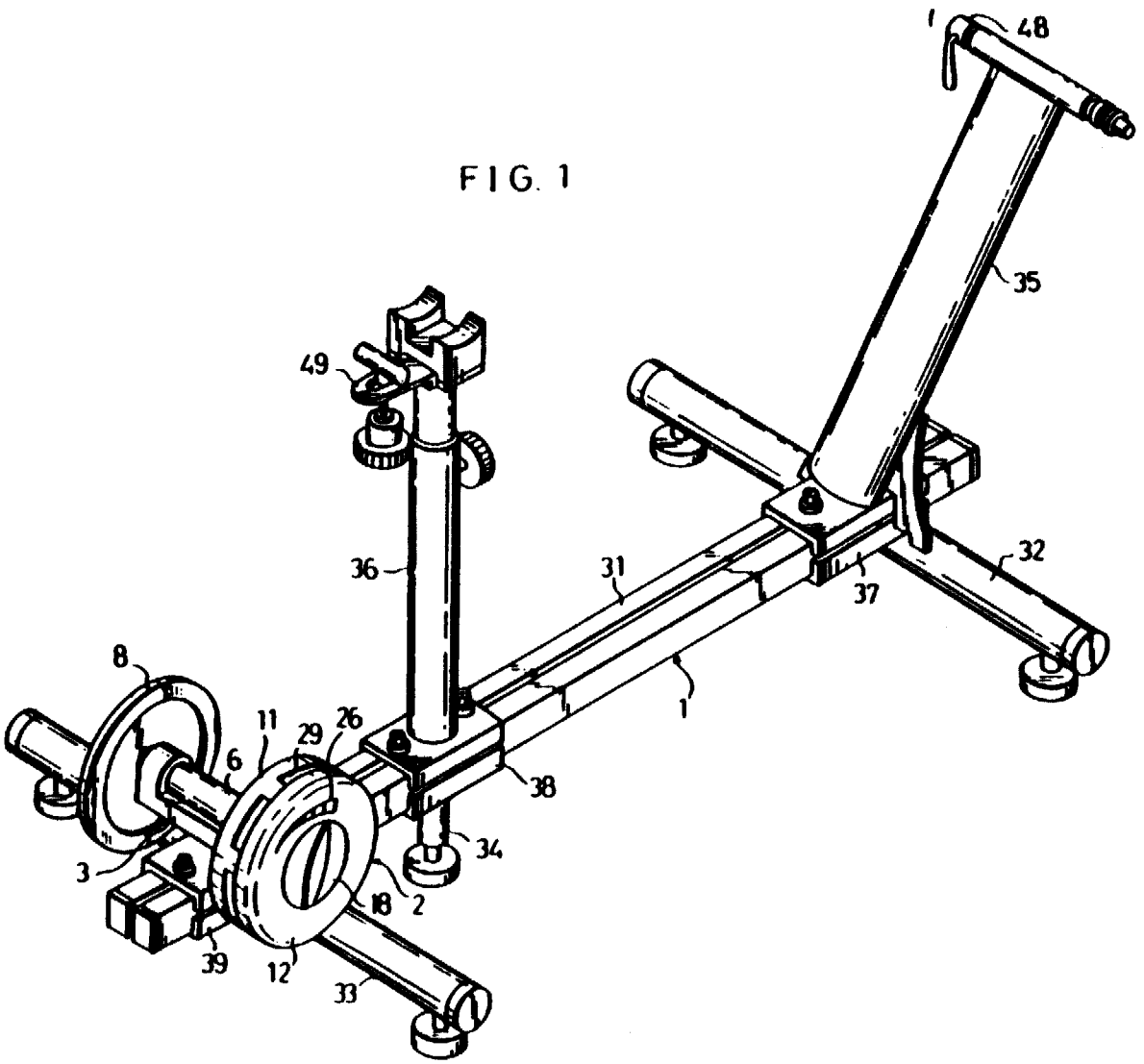
FIG. 1 is a perspective drawing which shows the support frame of an exercising apparatus provided with the resistance applying means of this invention.
Figure 2:
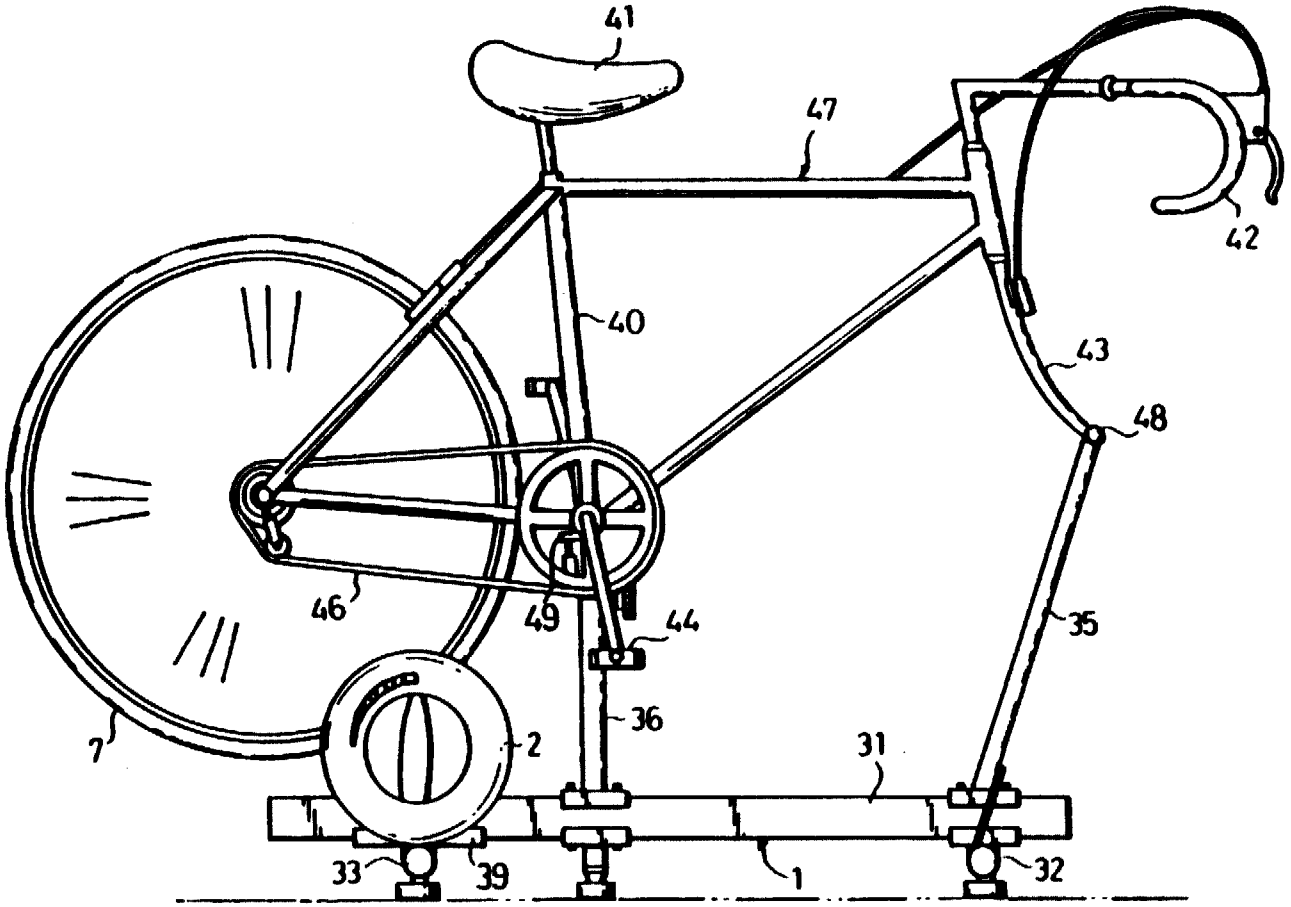
FIG. 2 is a side view showing an entire exercising apparatus in which a bicycle frame without a front wheel is provided on a support frame.

As shown in FIGS. 1 and 2, the support frame 1 comprises a longitudinally extending main frame member 31, front and rear stabilizer frame members 32, 33 which intersect the main frame member 31 at right angles, a central supporting foot 34, an obliquely angled front support member 35, and an elastic rear support member 36. The front stabilizer frame member 32 and the front support member 35 are mounted on the main frame member 31 through a front slider 37 whereby it is possible for their positions to be adjusted in the longitudinal direction. The central supporting foot 34 and the rear support member 36 are supported by the main frame member 31 through the central slider 38 such that their positions can be adjusted in the longitudinal direction. The rear stabilizer frame member 33 is mounted on the main frame member 31 through the rear slider 39 such that its position can be adjusted in the longitudinal direction.

Mounted on the support frame 1 is a bicycle 47 provided with a vertical frame member 40, a saddle, 41, a handle bar 42, a front wheel fork 43, foot pedals 44, a rear wheel 7, and a rear wheel driving means 46, etc. The lower end of the front wheel fork 43 which has no front wheel attached is fixedly supported by a connecting member 48 provided on the upper end of the front support member 35 of the support frame 1. The lower end of the vertical frame 40 is fixed to a fastening member 49 mounted at the upper end of the rear support member 36 of the support frame 1. The rear wheel 7 of the bicycle 47 is loaded on a resistance applying means 2 which is mounted on the upper surface of the rear slider 39 of the support frame 1.

The structure of the, resistance applying means 2 will be now explained with reference to FIGS. 3 to 5.

Figure 3:
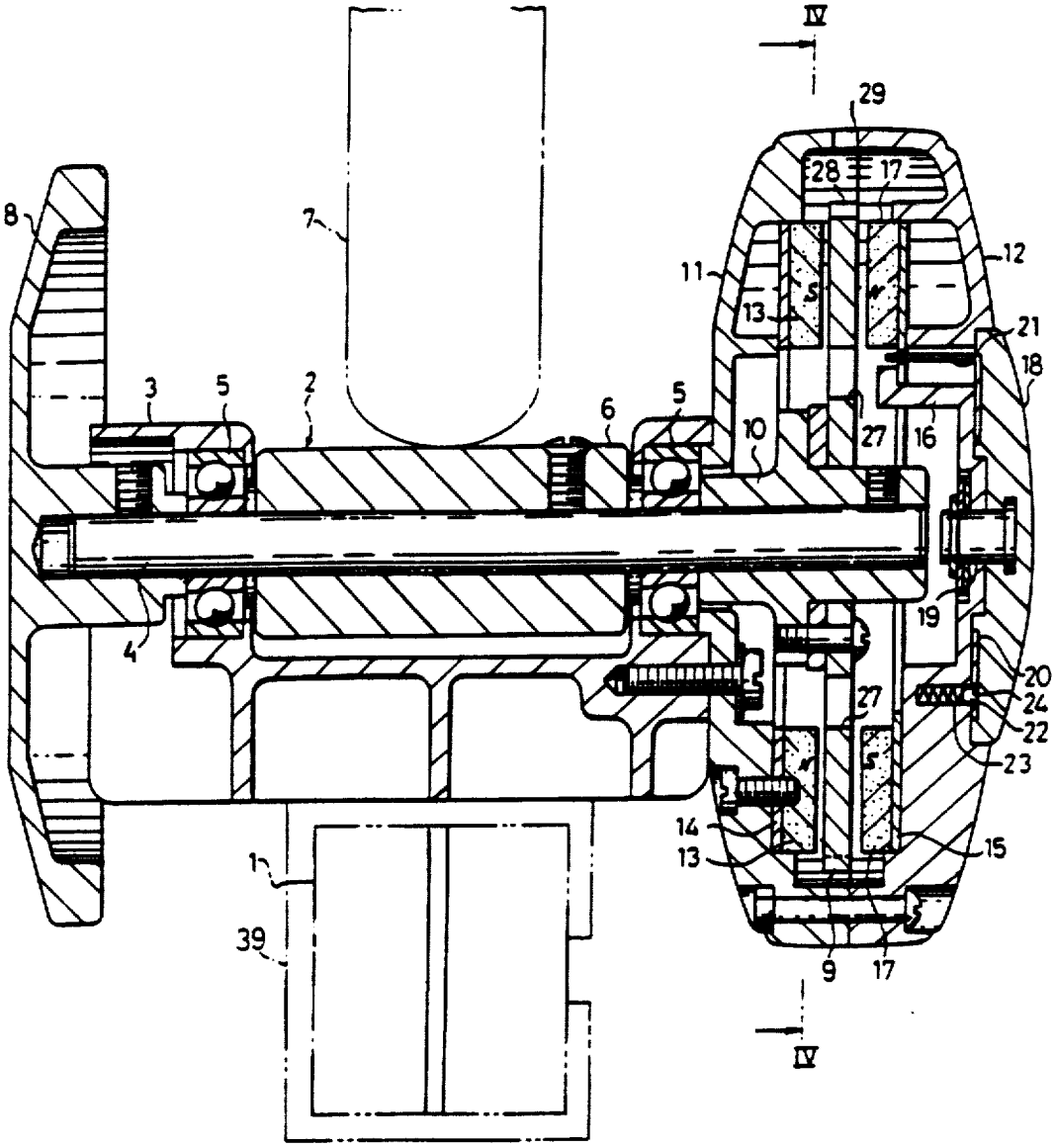
FIG. 3 is a sectional view of a resistance applying means for an exercising apparatus which illustrates an embodiment of this invention.

As shown in FIG. 3, a rotary shaft 4 is rotatably supported by a bracket 3, which is fixed to the upper surface of the rear slider 39, through two bearings 5. A driving cylinder 6 is engaged around the center of the rotary shaft 4 and rear wheel 7 of the exercising apparatus is maintained in contact with the external circumference thereof. The rotary shaft 4 is such as to be rotated by the rotation of the rear wheel 7, accompanying the rotating operation of the foot pedals 44 of the bicycle 47, through the driving cylinder 6.

A balancer 8 is fixed to one end of the rotary shaft 4 by mutual engagement and a rotating disk 9 made of metal (in the embodiment, aluminum) is fixed to the other end through a bush 10 by mutual engagement. This rotating disk 9 is smoothly rotated in equilibrium with the balancer 8. An approximately cup-shaped internal case 11 is fixed to the side surface of the bracket 3 such as to cover the rotating disk 9 from one side thereof and an approximately cup-shaped external case 12 is mounted on the open side of the internal case such as to cover the rotating disk 9 from the other side thereof.

A plurality (in the embodiment, (6) of permanent magnets 13 on the fixed side are provided on the inside surface of the internal case 11 through mounting disk 14 such that they are concyclically arranged at equal intervals in the vicinity of the one side surface of the rotating disk 9. The permanent magnets 13 on the fixed side are arranged such that the polarities of the side surface opposite to the rotating disk 9 are alternately different from the adjacent ones in the circumferential direction, as shown in FIGS. 3 and 4.

A supporting disk 15 is rotatably supported by the inside surface of the external case 12 and is held stationary by a plurality of supporting legs 16 provided on the external case 12. A plurality (in the embodiment, (6) of permanent magnets 17 on the movable side are mounted on the supporting disk 15 such that they are concyclically arranged at equal intervals in the vicinity of the other side surface of the rotating disk 9 in the state of facing the permanent magnets 13 on the fixed side. The permanent magnets 17 on the movable side are arranged such that the polarities of the side surfaces opposite to the rotating disk 9 are alternately different from the adjacent ones and that an eddy current is generated on the rotating disk 9 by the cooperation with the permanent magnets 13 on the fixed side during the rotation of the rotating disk 9.

An adjusting handle 18, which acts as a manual operation member, is rotatably provided on the center of the outside surface of the external case 12 through a pin 19 and is connected to the supporting disk 15 through a plurality of connecting pieces 21 on a connecting disk 20 fixed to the inside surface of the handle. An engaging ball 22 and a spring 23 are provided on the outside surface of the external case 12 so that the permanent magnets 17 on the movable side are held in desired adjusting positions by selectively engaging the ball 22 in a plurality of engaging holes 24 provided on the connecting disk 20 by means of the function of the spring 23 when the positions of the permanent magnets 17 on the movable side are changed and adjusted by rotating the supporting disk 15 with the adjusting handle 18.

Figure 5:
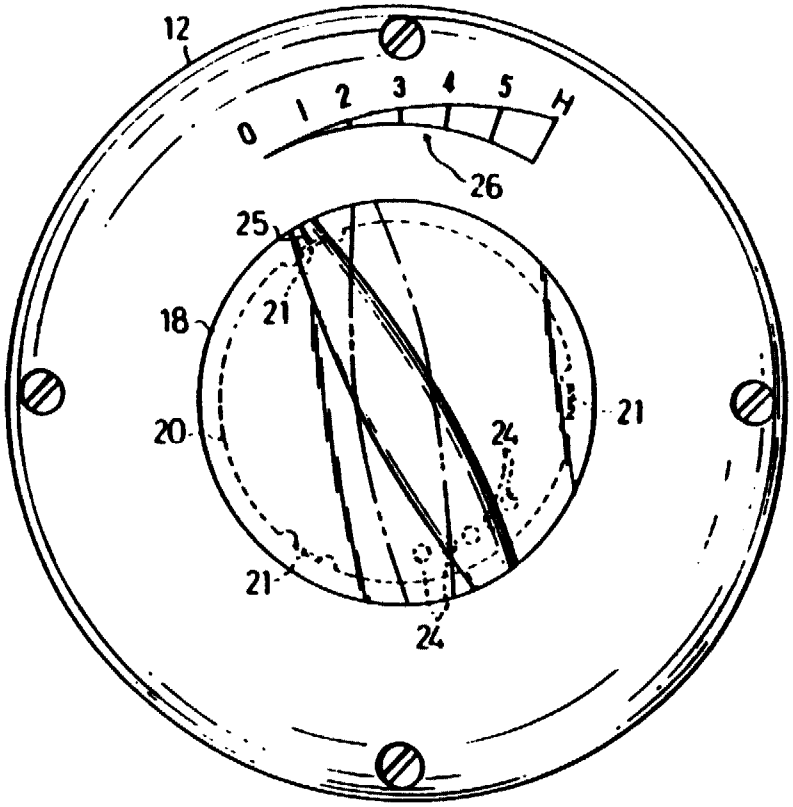
FIG. 5 is a right side view of the resistance applying means of this invention as shown in FIG. 3.

As shown in FIG. 5, an index 25 is provided on the outside surface at one end of the handle portion of the adjusting handle 18 and an indicating portion 26 for indicating the adjusting positions of loads is provided on the outside surface of the external case, corresponding to the index 25. These are constructed as follows: When the adjusting handle 18 is rotated to the position in which the index 25 indicates "0" on the indicating portion 26, the permanent magnets 17 on the movable side are coordinatedly arranged in a state in which the polarities of the side surfaces are the same as those of the permanent magnets 13 on the fixed side opposite thereto and the eddy current generated during the rotation of the rotating disk 9 becomes zero. By rotating clockwise the adjusting handle 18 shown in FIG. 5 from this state, the facing positions of the permanent magnets 17 on the movable side are displaced in order from the position with the same polarity to an adjacent position with a different polarity with respect to the permanent magents 13 on the fixed side opposite thereto, in the circumferential direction, the eddy current thereby being gradually increased. When the adjusting handle 18 is rotated to the position in which the index 25 indicates "H" on the indicating portion 26, the permanent magnets 17 on the movable side are coordinately arranged in a state in which the polarities of the side surfaces are different from those of the permanent magnets 13 on the fixed side opposite thereto, the eddy current thus reaching its maximum value.

Figure 4:
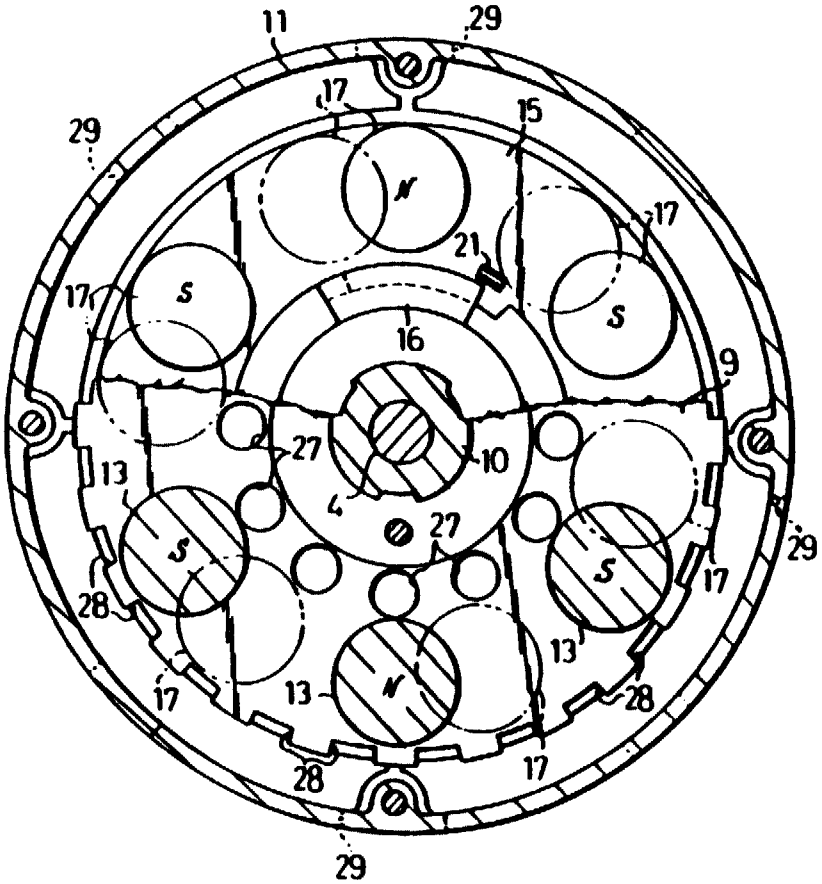
FIG. 4 is a sectional view taken along the line IV—IV in FIG. 3 which shows the configuration of permanent magnets.

Furthermore, in this embodiment, as shown in FIGS. 3 and 4, a large number of through holes 27 and convex and concaves 28 are formed on the rotating disk 9 and a plurality of openings 29 are formed on the external circumference of the internal case 11 so that a small degree of air resistance is supplementarily applied to the rotating disk 9 during the rotation thereof and a light load is applied to the foot pedals 44 even if the eddy current is adjusted and set at zero.

The function of the exercising apparatus constructed in accordance with the above description will next be explained.

In this exercising apparatus, when the rear wheel 7 is rotated by the rotating operation of the foot pedals 44 with the user sitting on the saddle 41, the rotary shaft 4 is rotated through the driving cylinder 6 and the balancer 8 and the rotating disk 9 at both ends are smoothly rotated as a unit. During this rotation, the permanent magnets 13 and 17 on the fixed and the movable sides are placed opposite to each other with the rotating disk 9 between them and an eddy current is thus generated on the rotating disk 9 such as to apply resistance to the rotation thereof, with a load thereby being applied to the rotating operation of the pedals 44. The load caused by the eddy current is different from that caused by the braking device and does not decrease even with use over a long period. Therefore, it is possible to exercise in a room in the same manner as when pedalling a bicycle by rotating the foot pedals 44. Since the air is not disturbed by the rotation of the balancer 8 and the rotating disk 9 in this exercising apparatus, it is possible to use this exercising apparatus comfortably without generating any noise and flinging up dust.

In addition, the magnitude of the eddy current generated on the rotating disk 9 in this exercising apparatus is changed by varying the positions of the permanent magnets 17 on the movable side facing those 13 on the fixed side by rotating the adjusting handle 18 so that the load applied to the rotating operation of the foot pedals 44 can be easily adjusted. Therefore, this apparatus can be used at a desired load condition by adjusting and setting the load in accordance with the physical strength of the user, etc.

This invention is not limited to the configuration of the above-mentioned embodiment and may, for example, be so constructed that the rotary shaft 4 is rotated by the rotating operation of the foot pedals 44 through a chain, etc, and the rotating disk 9 and the permanent magnets 13 and 17 may be provided on both ends of the rotary shaft 4.

As many apparently widely different embodiments of this invention may be made without departing from the spirit and scope thereof, it is to be understood that the invention is not limited to the specific embodiments thereof except as defined in the appended claims.

What is claimed is:

1. A resistance applying means for an exercising apparatus having a support frame on which a bicycle provided with at least a saddle and foot pedals is supported, comprising a rotary shaft rotatably supported by said support frame and driven by operating said foot pedals; a rotating metal disk having a circumference, a plurality of alternating convex and concave portions along the circumference and a plurality of through holes and being fixed to said rotary shaft; a plurality of permanent magnets fixed opposite the circumference of said rotating disk at equal intervals and having polarities alternately different from each other; a plurality of permanent magnets provided opposite the circumference of said rotating disk at equal intervals and rotatable about said rotary shaft and having polarities alternately different [form] *from* each other, said rotating disk being interposed between said fixed magnets and said rotatable magnets; an adjusting mechanism for selectively rotating said rotatable magnets, thereby arranging said rotatable magnets between a position completely facing said fixed magnets so that the polarities of said rotatable magnets are the same as those of said fixed magnets faced and a position completely facing said fixed magnets so that the polarities of said rotatable magnets are different from those of said fixed magnets [face] *faced*; and a casing for receiving the rotating metal disk and the permanent magnets, the casing having a circumference portion, *and a plurality of openings through said circumference portion*, said openings, said through holes and said alternating convex and concave portions cooperating to apply a small degree of air resistance to said rotating disk during the rotation thereof.

2. A resistance applying means for an exercising apparatus according to claim 1 further comprising a manual operation member on said casing for operation said adjusting mechanism.

3. A resistance applying means for an exercising apparatus according to claim 1, wherein one end of said rotary shaft is fixed to said rotating disk and another end of said rotary shaft is provided with a flywheel for smoothing the rotation of said rotating disk.

*4. An exerciser, comprising:*

*a braking device including a rotatable disk having a circumference portion;*

*a frame supporting a rotatable wheel of a bicycle such that said wheel is in operative engagement with said rotatable disk;*

*a casing for receiving said rotatable disk; and*

*said braking device including magnetic braking means and air braking means both for resisting the rotation of said disk, said disk forming part of said magnetic braking means and said air braking means; and*

*said air braking means including a plurality of raised portions formed on said circumference portion of said rotatable disk, and means which interact with said raised portions to provide air resistance to the rotation of said rotatable disk.*

*5. An exerciser according to claim 4, wherein said means to interact with said raised portions includes through holes formed in said disk.*

*6. An exerciser according to claim 5 wherein said means to interact with said raised portions further includes a circumference portion for said casing and a plurality of openings formed in said circumference portion of said casing.*

*7. An exerciser according to claim 4, wherein said magnetic braking means includes a first magnet and a second magnet positioned on opposite sides of said disk, said disk being formed of a magnetically conductive material and said disk moving through a magnetic field created by said magnets when said disk is rotated to produce eddy currents in said disks.*

*8. An exerciser according to claim 4, wherein said magnetic braking means includes a first pair of magnets positioned on one side of said disk and having polarities different from each other; and a second pair of magnets positioned on the opposite side of said disk and having polarities different from each other, said disk being formed of a magnetically conductive material and said disk moving through a magnetic field created by said magnets when said disk is rotated to produce eddy currents in said disks.*

*9. An exerciser according to claim 8, wherein said magnetic braking means includes means for varying said magnetic field.*

*10. An exercise according to claim 9, wherein said means for varying said magnetic field includes means for moving said first and second pairs of magnets relative to one another.*

*11. An exerciser according to claim 10, wherein said moving means comprises means for moving said second pair of magnets between a first position wherein each magnet of said second pair faces a respective magnet of said first pair having the same polarity and a second position where each magnet of said second pair faces a respective magnet of said first pair having the opposite polarity.*

*12. An exerciser according to claim 10, wherein said moving means causes said second pair of magnets to rotate about an axis about which said disk rotates.*

*13. An exerciser according to claim 12, wherein said moving means includes a manually operated member for manually adjusting the relative position of said first and second pairs of magnets.*

*14. A braking device, comprising:*

*an exposed rotatable shaft which may be placed in operative contact with a wheel of an exercise device;*

*a rotatable disk having a circumference portion operatively coupled to said shaft for rotation therewith;*

*a casing receiving said rotatable disk;*

*a magnetic brake for resisting rotation of said disk, said disk forming part of said magnetic brake; and*

*an air resistance brake for resisting rotation of said disk, said disk forming part of said air resistance brake;*

*said air resistance brake including a plurality of raised portions formed on said circumference portion of said rotatable disk, and means which interact with said raised portions to provide air resistance to the rotation of said rotatable disk.*

*15. A resistance applying device for use with an exercising apparatus having a driven wheel, said resistance applying device comprising:*

*a rotatable shaft including a contact surface arranged or contacting the periphery of said driven wheel, said rotatable shaft to be rotated by a frictional engagement with said driven wheel, when said driven wheel is rotated;*

*a rotatable disk having a circumference portion carried by said rotatable shaft for rotation therewith;*

*a casing having a circumference portion that receives said rotatable disk, said casing being arranged such that it does not encase said contact surface of said rotatable shaft;*

*a pair of magnets of opposite polarity mounted within said casing on generally opposite sides of said rotatable disk at positions spaced from said rotatable disk for generating eddy currents within said rotatable disk to provide resistance to the rotation of said rotatable disk; and*

*adjustment means for selectively adjusting the relative strength of the eddy currents generated in said rotatable disk by said magnets to vary the resistance created by said resistance applying device.*

*16. A resistance applying device as set forth in claim 15, further comprises air resistance generating means formed on said rotatable disk for resisting the rotation of said rotatable disk.*

*17. A resistance applying device as set forth in claim 16, wherein said air resistance generating means includes a plurality of raised portions formed on said circumference portion of said rotatable disk, and means which interact with said raised portions to apply air resistance to the rotation of said rotatable disk.*

*18. A resistance applying device as set forth in claim 15 wherein said exercising apparatus is a bicycle, and said resistance applying device further comprising a bicycle stand for supporting said bicycle.*

*19. A resistance applying device as set forth in claim 15 wherein said rotatable disk and casing are located at a first end of said rotatable shaft, and said rotatable shaft having an enlarged contact member that includes said contact surface for engaging said driven wheel to provide said frictional engagement.*

*20. A resistance applying device as set forth in claim 19 wherein said enlarged contact member is located at a middle portion of said rotatable shaft, and said resistance applying device further comprising a balancing disk carried by a second end of said rotatable shaft for dynamically balancing said rotatable shaft.*

*21. A resistance applying device as set forth in claim 15, further comprising a multiplicity of magnets, said magnets being arranged in two sets disposed on opposite sides of said rotatable disk, said magnets within each set being arranged with alternating polarities.*

*22. A resistance applying device as set forth in claim 21, wherein said adjustment means is arranged to permit the selective movement of at least one of said magnet sets relative to the other from a position wherein each magnet is generally positioned opposite a magnet of the same polarity to a position wherein each magnet is generally positioned opposite a magnet of the opposite polarity to permit selective variation of the resistive load produced by said resistance applying device.*

*23. A resistance applying device as set forth in claim 21 wherein said magnets in each set are concentrically positioned about the rotational axis of said rotatable disk at substantially equal intervals.*

*24. A resistance applying device for use with a bicycle having a driven wheel and a bicycle stand for supporting at least said driven wheel of said bicycle, said resistance applying device comprising:*

*a rotatable shaft arranged for contacting the periphery of said driven wheel, said rotatable shaft to be rotated by a frictional engagement with said driven wheel when said driven wheel is rotated, said rotatable shaft including an enlarged contact member for engaging said driven wheel to provide said frictional engagement;*

*a rotatable disk having a circumference portion carried by a first end of said rotatable shaft for rotation therewith;*

*a casing having a circumference portion that receives said rotatable disk, said casing being arranged such that it does not encase said contact member;*

*a pair of magnets of opposite polarity mounted within said casing on generally opposite sides of said rotatable disk at positions spaced from said rotatable disk for generating eddy currents within said rotatable disk to provide resistance to the rotation of said rotatable disk; and*

*adjustment means for selectively adjusting the relative strength of the eddy currents generated in said rotatable disk by said magnets to vary the resistance created by said resistance applying device.*

*25. A resistance applying device as set forth in claim 24 further comprising air resistance generating means formed on said rotatable disk for resisting the rotation of said rotatable disk.*

*26. The resistance applying device as set forth in claim 25, wherein said air resistance generating means includes a plurality of raised portions formed on said circumference portion of said rotatable disk and means which interact with said raised portions to apply air resistance to the rotation of said rotatable disk.*

* * * * *